United States Patent [19]

Kashiwabara

[11] Patent Number: 4,701,057
[45] Date of Patent: Oct. 20, 1987

[54] LINEAR MOTION ROLLING CONTACT BEARING ASSEMBLY

[75] Inventor: Yoshihiro Kashiwabara, Yokosuka, Japan

[73] Assignee: Nippon Thompson Co., Ltd., Tokyo, Japan

[21] Appl. No.: 893,527

[22] Filed: Aug. 6, 1986

[30] Foreign Application Priority Data

Aug. 9, 1985 [JP] Japan ............................. 60-174215

[51] Int. Cl.⁴ .......................................... F16C 29/06
[52] U.S. Cl. ...................................... 384/45; 384/43
[58] Field of Search ................. 384/18, 19, 22, 37, 384/43-45, 49, 59

[56] References Cited

U.S. PATENT DOCUMENTS

| | | | |
|---|---|---|---|
| 2,325,896 | 8/1943 | Waller | 384/19 |
| 2,889,181 | 6/1959 | Lang et al. | 384/45 |
| 3,304,133 | 2/1967 | Strassberg | 384/44 |
| 3,467,447 | 9/1969 | Newman | 384/45 |
| 3,778,120 | 12/1973 | Hagen et al. | 384/18 |
| 4,582,371 | 4/1986 | Mottate | 384/45 |

Primary Examiner—Stuart S. Levy
Assistant Examiner—Thomas R. Hannon
Attorney, Agent, or Firm—Alan H. MacPherson; Paul J. Winters; Kenneth E. Leeds

[57] ABSTRACT

A linear motion rolling contact bearing assembly includes a slider unit having a main body, in which a pair of endless circulating paths for rolling members is formed, and a U-shaped frame, and having a rail extending over a predetermined length and having a U-shaped cross section for slidably receiving therein the slider unit. An end mounting section for mounting to an exterior member outside of the assembly is formed at least at one end of the U-shaped rail and/or the U-shaped frame. Thus, any deformation and/or distortion, which may be produced when mounting the assembly to an apparatus, is prevented from being transmitted to the remaining part of the assembly, thereby maintaining a high dimensional precision and structural integrity.

11 Claims, 7 Drawing Figures

LINEAR MOTION ROLLING CONTACT BEARING ASSEMBLY

BACKGROUND OF THE INVENTION

1. Field of the Invention

This invention relates to a bearing assembly for allowing a relative linear motion between two elements theoretically for an indefinite length, and, in particular, to a linear motion rolling contact bearing assembly suitable for use in high-precision apparatuses, such as NC machining tools, robots, information and office automation equipment.

2. Description of the Prior Art

A linear motion rolling contact bearing assembly is known in the art and it includes a rail extending straight over a desired length, a slider slidably mounted on the rail and a plurality of rolling members interposed between the rail and the slider, thereby providing a rolling contact between the rail and the slider. Such a linear motion rolling contact bearing assembly may be applied to various equipment and machines whenever a relative linear motion between two elements is required. In general, such a linear motion rolling contact bearing assembly is preferably compact in side. Thus, use is typically made of a thin steel plate for forming the rail and/or slider, at least partly. In this case, because of the reduced rigidity of a thin steel plate, it is often difficult to obtain true straightness for the rail and/or slider, which then constitutes an obstacle for wide application of such a linear motion rolling contact bearing assembly.

For example, in the past, such a linear motion rolling contact bearing assembly was often used in such devices as cabinets and desk drawers, which do not require close tolerances. However, partly due to the recent dissemination of various advanced office automation equipment, such as office computers, word processors, and copiers, as well as robots, and machining tools, there has arisen a need to develop a novel linear motion rolling contact bearing assembly high in precision, light in weight, and small in size. In particular, since such a linear motion rolling contact bearing assembly is mounted in an apparatus when used, it is critical that error or distortion produced due to such mounting is minimized or preferably non-existent.

SUMMARY OF THE INVENTION

In accordance with the present invention, there is provided a linear motion rolling contact bearing assembly comprising a rail extending over a predetermined length having a U-shaped cross section, a slider unit slidably housed in said rail which includes a main body and a frame fixedly attached to said main body, the frame having a U-shaped cross section, and a plurality of rolling members interposed between the rail and the slider unit, thereby providing a rolling contact between the rail and the slider unit. At least one of the rail and the frame is provided with an end mounting section for mounting to an external element at each end thereof. Preferably, such an end mounting section is defined as an end projection extending from each end of the rail and/or frame, and at least one notch is provided at the base of the end mounting section as a stress relief area.

It is therefore a primary object of the present invention to obviate the disadvantage of the prior art as described above and to provide a novel linear motion rolling contact bearing assembly.

Another object of the present invention is to provide an improved linear motion rolling contact bearing assembly high in precision, light in weight, and compact in size.

A further object of the present invention is to provide an improved linear motion rolling contact bearing assembly suitable for use in high-precision equipment, such as NC machining tools and office automation apparatuses.

A still further object of the present invention is to provide a linear motion rolling contact bearing assembly which produces no or a minimum of dimensional error or distortion upon mounting to a desired apparatus.

Other objects, advantages and novel features of the present invention will become apparent from the following detailed description of the invention when considered in conjunction with the accompanying drawings.

DESCRIPTION OF THE PREFERRED EMBODIMENTS

Figure 1:
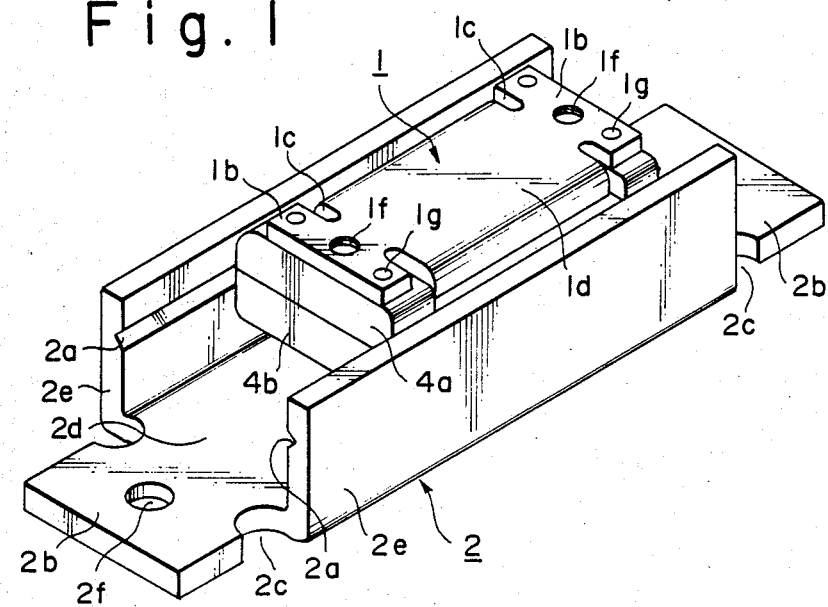
FIG. 1 is a schematic illlustration showing in perspective a linear motion rolling contact bearing assembly constructed in accordance with one embodiment of the present invention.

Referring now to FIG. 1, there is schematically shown a linear motion rolling contact bearing assembly constructed in accordance with the one embodiment of the present invention. As shown, the illustrated linear motion rolling contact bearing assembly includes a slider unit 1 and a rail 2 along which the slider unit 1 moves slidingly. The slider unit 1 includes a frame which has a generally U-shaped cross section and thus includes a flat top wall 1d and a pair of side walls 1e, 1e (FIG. 4) each depending downward from the corresponding side of the flat top wall 1d. The slider unit 1 also includes a main body comprised of upper and lower body sections 4a and 4b, which are preferably formed of a plastic material, for example, by injection molding. In the illustrated embodiment, the frame also serves to hold the upper and lower body sections 4a and 4b together, thereby defining an integrated structure as the slider unit 1.

The frame is preferably formed from a thin steel plate by bending. In the illustrated embodiment, the frame is also provided with a pair of end mounting sections 1b, 1b one at each end. As shown, each of these end mounting sections 1b, 1b is formed as an end projection extending from the corresponding end of the flat top wall 1d. Also provided in the frame is a pair of notches or cut-away portions 1c, 1c at the base of each of the end mounting sections 1b, 1b. In other words, the pair of notches 1c, 1c is provided at the connection between the end mounting section 1b and the flat top wall 1d. Each of the end mounting sections 1b, 1b is fixedly attached to the main body by means of fixing means, such as rivets or bolts, which extend through a pair of fixing holes 1g, 1g. Each of the end mounting sections 1b, 1b is also provided with a mounting hole 1f generally at the center thereof, which is threaded in the illustrated embodiment. Therefore, the slider unit 1 may be fixedly attached to an exterior member of an apparatus to which the present bearing assembly is to be mounted, for example, by threading a mounting bolt into the mounting hole 1f. Since the mounting sections 1b, 1b are provided at the opposite ends of the frame, any deformation or distortion, which may be produced by tightening a bolt threaded into the mounting hole 1f, is prevented from occurring to the other part of the slider unit 1. Therefore, the structural integrity of the slider unit 1 is not damaged even if the slider unit 1 is fixedly and tightly attached to an exterior member.

Figure 2:
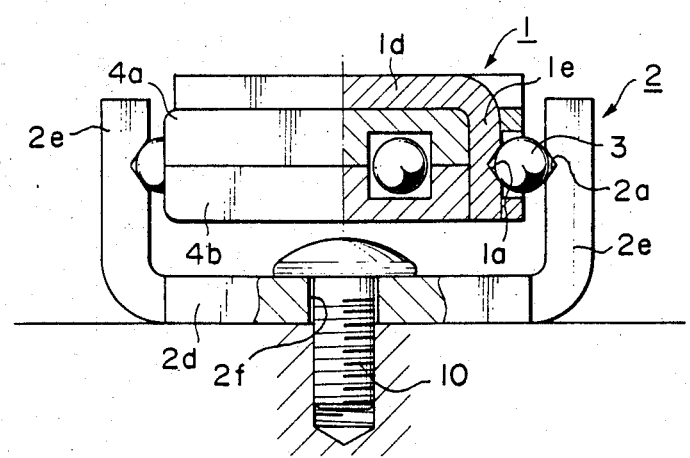
FIG. 2 is a schematic illustration showing partly in transverse cross section the structure shown in FIG. 1.
Figure 4:
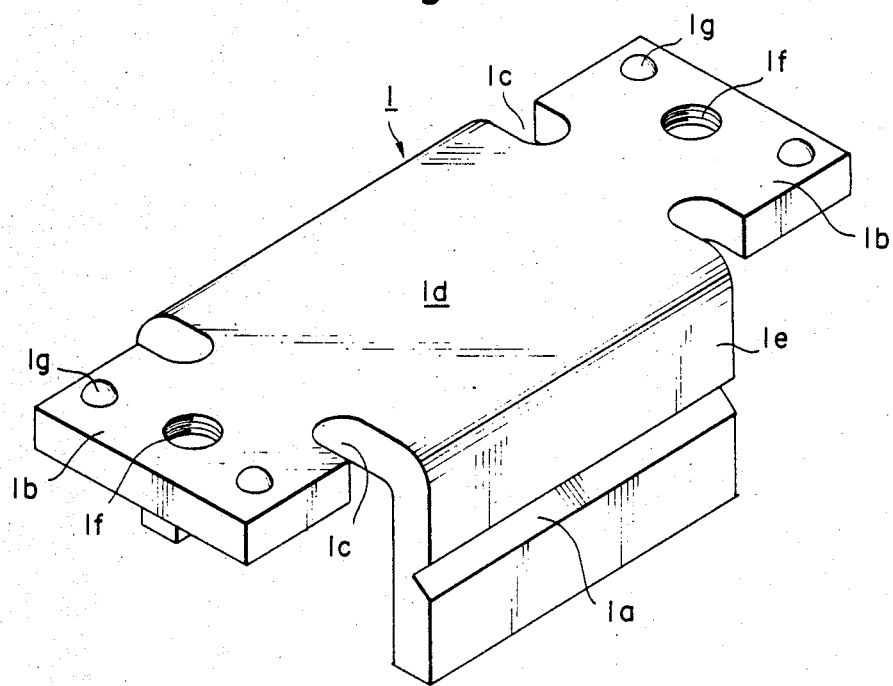
FIG. 4 is a schematic illustration showing in perspective the frame defining part of the slider unit 1 provided in the structure shown in FIG. 1.

As best known in FIG. 4, the frame of the slider unit 1 has a pair of depending side walls 1e, 1e, each of which has an outer surface provided with a horizontally extending straight inner guide groove 1a. In the illustrated embodiment, as best shown in FIG. 2, the inner guide groove 1a has a generally V-shaped cross section. As will be made clear later, this inner guide groove 1a defines part of a load section of an endless circulating path defined in the slider unit 1.

Figure 5:
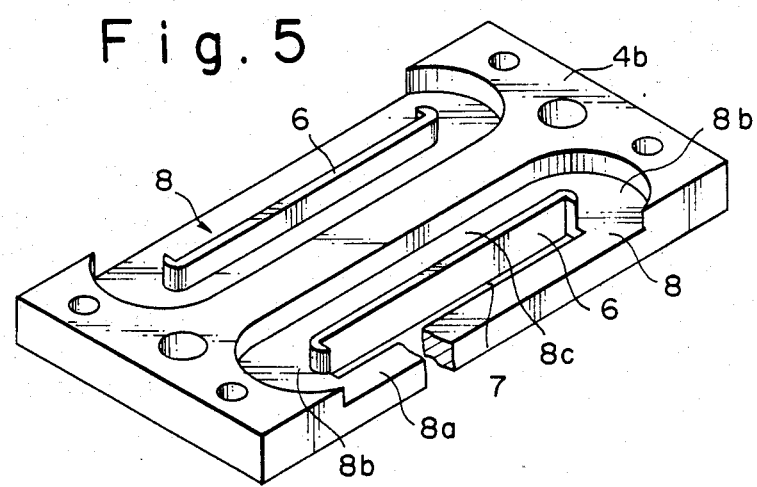
FIG. 5 is a schematic illustration showing in perspective the lower main body 4b defining part of the slider unit 1 provided in the structure shown in FIG. 1.

As briefly described above, the main body is comprised of a pair of upper and lower body sections 4a and 4b, which are identical in structure and which are placed one on top of the other. The detailed structure of the lower body section 4b (same for the upper body section 4a) is illustrated in FIG. 5. The lower body section 4b is generally in the shape of a plate and is provided with a pair of generally O-shaped grooves 8, 8, each defining a endless circulating path for a plurality of balls 3. Each of the O-shaped grooves 8, 8, defining an endless circulating path, includes a load section 8a, a return section 8c and a pair of connecting sections 8b, 8b, each connecting the corresponding ends of the load and return sections 8a and 8b. Inside of each of the O-shaped grooves 8, 8 is provided a guide wall 6, which serves to define a part of the return section 8c for the balls 3 and also to guide the insertion of the corresponding side wall 1e of the frame when it is inserted into a slot 7 formed adjacent to the guide wall 8 and the load bearing section of the O-shaped groove 8. In this manner, since each of the upper and lower body sections 4a and 4b is provided with a pair of mounting slots 7, 7 adjacent to the guide walls 6, 6, into which the respective side walls 1e, 1e of the frame are snugly inserted, the slider unit 1 has an enhanced structural integrity when assembled. As also shown in FIG. 5, the lower body section 4b (same in the case of the upper body section 4a) includes an extended end section which is provided with three holes corresponding to the mounting hole 1f and the fixing holes 1g, 1g of the frame. When use is made of rivets, they may extend through the frame and the main body. In addition, when a mounting bolt is threaded into the mounting hole 1f of the frame, its tip end may project into the corresponding hole in the main body. It is to be noted that the upper and lower body sections 4a and 4b may be preferably formed of a plastic material by injection molding. Since the upper and lower body sections 4a and 4b are identical in structure, they may be manufactured in mass, and two of them are selected arbitrarily and put together to define the main body. Thus, the manufacture of the slider unit 1 is extremely easy, but the assembled structure has an increased integrity because the upper and lower body sections 4a and 4b are virtually clamped by the frame when assembled.

Figure 3:
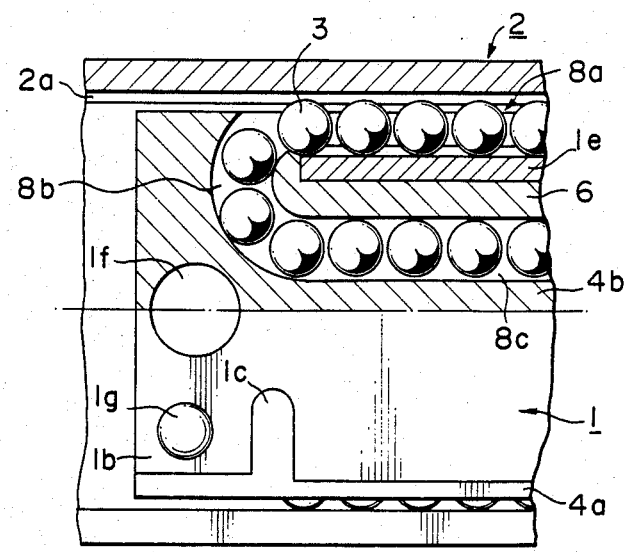
FIG. 3 is a schematic illustration showing partly in horizontal cross section a part of the structure shown in FIG. 1.

As shown in FIGS. 2 and 3, a plurality of balls 3 are placed within each of the pair of endless circulating paths 8, 8 defined in the main body of the slider unit 1. These balls 3 can roll along each of the endless circulating 8, 8. Those balls 3 which are located at the load sectins 8a, 8a are interposed between the slider unit 1 and the rail 2, thereby providing a rolling contact between the slider unit 1 and the rail 2. Since the balls 3 can rotate indefinitely along the associated endless circulating path 8, theoretically there may be provided an unlimited relative motion between the slider unit 1 and the rail 2. As seen from FIGS. 2 and 3, the balls 3 at the load section 8a are guided along the inner guide groove 1a of the side wall 1e of the frame, which is inserted into the mounting slot 7 formed in each of the upper and lower body sections 4a and 4b.

The rail 2 of the present linear motion rolling contact bearing assembly is preferably formed of a thin steel plate by bending. The rail 2 is bent to have a generally U-shaped cross section, and thus it includes an elongated, flat bottom wall 2d and a pair of side walls 2e, 2e each extending straight upward from the corresponding side of the flat bottom wall 2d. Thus, the rail 2 generally has a shape of a trough or a channel. The distance between the side walls 2e, 2e of the rail 2 is dimensioned so that the slider unit 1 may be slidably received in the interior space defined by the rail 2. Each of the side walls 2e, 2e of the rail 2 is provided with a horizontally extending straight outer guide groove 2a, V-shaped in cross section in the illustrated embodiment, at its inside surface. When assembled, the outer guide groove 2a is located opposite to the corresponding inner guide groove 1a of the slider unit 1, so that the load section 8a is actually defined by the opposite inner and outer guide grooves 1a and 2a.

In accordance with the present invention, the rail 2 is also provided with an end mounting section 2b at each end thereof. In the illustrated embodiment, each of the end mounting sections 2b, 2b is actually defined as an end projection extending from the end of the flat bottom wall 2d of the rail 2. Each of the end mounting sections 2b, 2b is provided with a mounting hole 2f located generally at its center, and this mounting hole 2f may be threaded, if desired. FIG. 2 shows the case when a bolt 10 is threaded into a threaded hole in an exterior member as extending through the mounting hole 2f of the rail 2 for having the rail 2 fixedly attached to an exterior member, such as the housing of an apparatus. The rail 2 is also provided with a pair of notches or cut-away portions 2c, 2c (see FIG. 1) at the proximal end of each of the end mounting sections 2b, 2b. The paired notches 2c, 2c are located at the opposite sides and they function as a stress relieving means, so that any deformation or distortion, which may be produced in the end mounting section due to tightening of the screw 10, is prevented from occurring to the other part of the rail 2. It should be understood that the provision of the end mounting sections 2b, 2b as projections from the ends of the rail 2 may be sufficient in some applications for preventing the propagation of deformation or distortion to the remaining part of the rail 2; however, the additional provision of at least one of notches 2c, 2c will further increase the ability to prevent the occurrence of such distortion propagation. This argument also holds true for the structure of the frame of the slider unit 1.

In the above-described embodiment, the notches 1c and 2c are shown as U-shaped notches; however, the notches 1c and 2c may have any other desired shape. In addition, the extended end mounting sections 1b and 2b are provided for each of the slider unit 1 and the rail 2; however, there may be a case where such an extended end mounting section may be provided for either one of the slider unit 1 and the rail 2. Furthermore, the end mounting projection is formed as an extension of the flat top wall 1f for the slider unit 1 and of the flat bottom wall 2d for the rail 2 in the above-described embodiment. However, such an end mounting projection may also be formed as an extension of either one or both of the side walls 1e, 1e or 2e, 2e, if desired.

Figure 6:
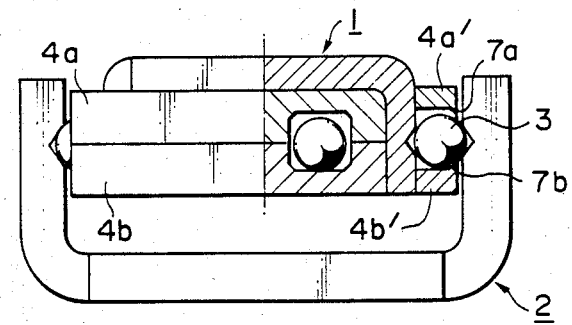
FIGS. 6 and 7 are schematic illustrations showing partly in cross section two alternative embodiments of the present invention.

FIG. 6 shows a linear motion rolling contact bearing assembly constructed in accordance with the present invention. Since this embodiment is similar in many respects to the present invention, like elements are indicated by like numerals. The present embodiment differs from the previously described embodiment in that each of the upper and lower body sections 4a and 4b has side extensions 4a', 4b' respectively at each side, which is provided with inwardly extending ball retaining ridges 7a, 7b. Thus, when the upper and lower body sections 4a and 4b are assembled as shown in FIG. 6, the balls 3 located in the load section 8a of the endless circulating path and thus between the inner and outer guide grooves 1a and 2a are prevented from slipping away from the main body 4. Thus, the gap between the ball retaining ridges 7a, 7b of the upper and lower body sections 4a and 4b when assembled must be at least slightly smaller than the diameter of the balls 3.

Figure 7:
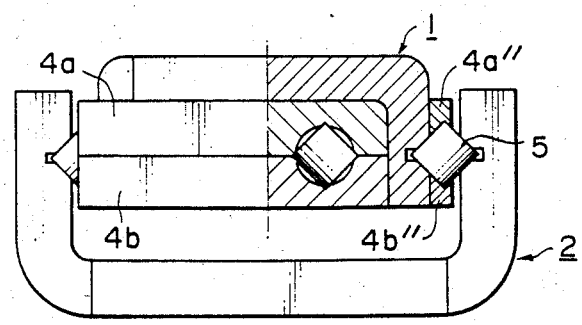

FIG. 7 shows a further alternative embodiment employing cylindrical rollers 5 as rolling members. In this case, the rollers 5 are arranged in a crossed arrangement in the endless circulating path 8, so that any two adjacent rollers 5 are oriented with their rotating axes extending perpendicular to each other and to the direction of rolling movement of the rollers 5. Because of the shape of the cylindrical rollers 5, the endless circulating path 8 must have a corresponding cross sectional shape. Thus, the upper and lower body sections 4a and 4b have side extenstion 4a" and 4b", respectively, each of which is provided with a top or bottom V-shaped guide groove, which serves to retain the rollers 5 in position and prevent them from slipping away from the main body.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact bearing assembly, comprising:
    a rail extending over a predetermined length and including a pair of first guide grooves extending straight in parallel;
    a slider unit provided with a pair of endless circulating paths, each of which is partly defined by a second guide groove extending straight in an opposed relation to the corresponding one of said pair of first guide grooves, said slider unit including a main body in which said pair of endless circulating paths are defined and a frame fixedly attached to said main body;
    a plurality of rolling members provided in each of said pair of endless circulating paths, whereby those rolling members located between said first and second guide groove provide a rolling contact between said rail and said slider unit; and
    whereby at least one of said rail and said frame is made from a thin plate to be generally U-shaped in cross section and includes an end mounting section formed at least at one end thereof as an extension extending over a predetermined length and having a predetermined width for mounting to a member exterior of said assembly, said end mounting section being provided with at least one notch at a proximal end thereof thereby locally narrowing the width at the proximal end.

2. The assembly of claim 1 wherein said rail is generally U-shaped and thus it includes a bottom wall and a pair of side walls each of which extends upward from the corresponding side of said bottom wall.

3. The assembly of claim 2 wherein said U-shaped rail is comprised of a thin steel plate and each of said pair of first guide grooves is defined in an inside wall of the corresponding one of said pair of side walls.

4. The assembly of claim 3 wherein said end mounting section is formed as an extension of said bottom wall at least at one end thereof.

5. The assembly of claim 4 wherein said end mounting section is provided with at least one mounting hole.

6. The assembly of claim 3 wherein said main body is comprised of a pair of upper and lower body sections identical in structure and combined in a face-to-face relation.

7. The assembly of claim 6 wherein said upper and lower body sections are provided with a pair of slots and said frame is generally U-shaped and thus includes a top wall and a pair of side walls depending from respective sides of said top wall, whereby said side walls of said frame are inserted into the respective slots of said upper and lower body sections, thereby holding the upper and lower body sections in position.

8. The assembly of claim 7 wherein said end mounting section is formed as an extension of said top wall of said frame at least at one end thereof.

9. The assembly of claim 8 wherein at least one notch is provided at a proximal end of said end mounting section.

10. The assembly of claim 8 wherein at least one hole is provided in said end mounting section.

11. The assembly of claim 8 wherein said frame is comprised of a thin steel plate and said upper and lower body sections are comprised of a plastic material.

* * * * *